Oct. 12, 1954     H. E. MALONE     2,691,712
CONTROL SWITCHING MECHANISM
Filed Dec. 1, 1951                          2 Sheets-Sheet 1
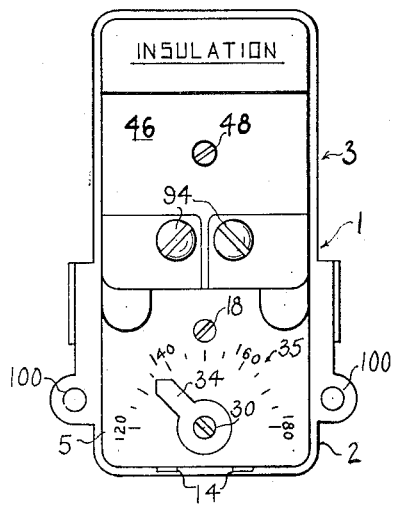
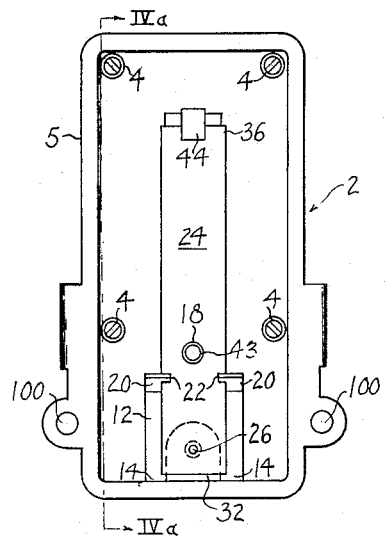
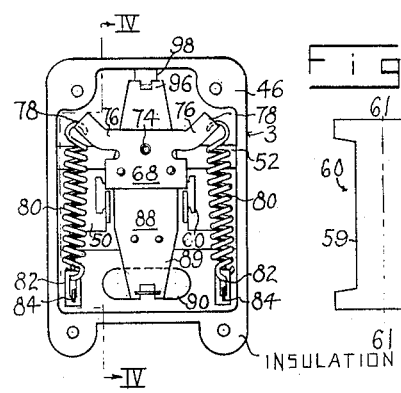
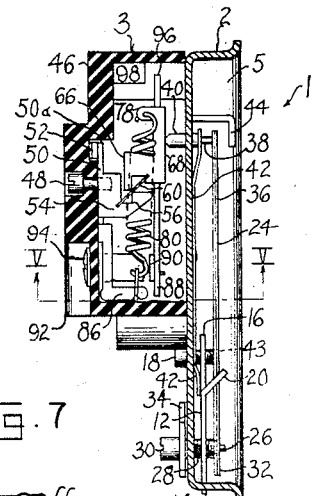
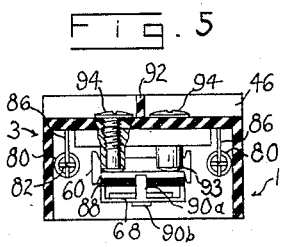
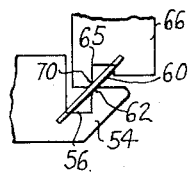
INVENTOR.
HOMER E. MALONE
BY
Tate & Weikart
ATTORNEYS Oct. 12, 1954  H. E. MALONE  2,691,712
CONTROL SWITCHING MECHANISM
Filed Dec. 1, 1951  2 Sheets-Sheet 2

INVENTOR.
HOMER E. MALONE
BY Tate & Weinhart
ATTORNEYS

Patented Oct. 12, 1954

2,691,712

UNITED STATES PATENT OFFICE 2,691,712

CONTROL SWITCHING MECHANISM

Homer E. Malone, Milwaukee, Wis., assignor to Perfex Corporation, Milwaukee, Wis., a corporation of Wisconsin Application December 1, 1951, Serial No. 259,352

18 Claims. (Cl. 200—166)

This invention concerns generally a control means such as a switch, utilizing a novel pivot assembly.

It has in the past been found that the elastic flexibility of a thin metallic strip may be used to provide a pivot for a moving part, such as a switch arm, and that such an arrangement, which may be referred to as a spring hinge or flexure pivot, has advantages, for certain applications, over either knife-edge or pin connections. For example, a spring hinge may be perfectly elastic since there are no moving parts in contact in the pivot to produce friction, also the spring hinge construction enables the pivot to withstand a sudden reversal of load which might unseat a knife-edge. Since there are no moving parts in contact, as in a pivot pin connection, no lubrication is necessary and no wear takes place.

It has also been found that when a flexure pivot is rotated the bending stresses in the material produce a restoring moment proportional to the amount of rotation. This restoring moment, except in cases where the angle of rotation is extremely small, will offer much greater resistance to rotation than the frictional forces developed in an equivalent knife-edge or pivot pin connection, however, this restoring moment, or stiffness, can be compensated for as will be pointed out below.

Using ordinary beam theory the stiffness of a flexure pivot may be easily computed, however, if the flexible member is subjected to an axial compressive load, the stiffness of the member is reduced by an amount which is a function of the magnitude of the compressive load and ordinary beam theory is no longer applicable. As the axial compression load on a flexible column member is increased, a critical value of the compressive load is finally reached in which the straight form of equilibrium becomes unstable and a slight lateral force on the member will produce a lateral deflection which does not disappear when the lateral force is removed. If the axial load is less than this critical value, the flexible member remains straight and undergoes only axial compression, and if a lateral force is then applied to the member, producing a small lateral deflection, this deflection disappears when the lateral force is removed. What is most important for the present discussion is the fact that the amount of this deflection, for a given lateral applied force will be much greater than that produced if the flexible member were not loaded axially, i. e., the stiffness of the flexible member is reduced by the application of the compressive load. This stiffness may be made to approach zero, so that rotation of the flexible member is completely unopposed, as the magnitude of the axial load is made to approach the critical, buckling value mentioned above. In general, when the axial load is one half the critical load the stiffness of the flexure member will be reduced by one half as compared to the stiffness of the member when not loaded axially.

It will be apparent, therefore, that a spring hinge pivot which provides for axial loading of the flexible member will have its stiffness reduced to an amount such that its flexibility will approach the unopposed flexibility of a knife-edge or pivot pin connection but will have none of the energy losses due to friction and vulnerability to wear that are inherent in such pivot connections.

An object of the present invention is to provide a pivot construction utilizing the above mentioned mechanical characteristics for use in a control member, such as a switch, which may be actuated by low energy-output actuating means.

A further object is to provide a condition responsive switch which includes a spring hinge pivot construction wherein the flexible member is subjected to an axial compressive load, not exceeding the critical buckling value, the flexible member being supported intermediate its ends to increase the stability of the pivot.

A further object is to provide a control mechanism utilizing a pivot construction in which the ratio of applied lateral force to the amount of deflection thereby produced (the spring rate or spring constant) is relatively small.

A further object is to provide a switch mechanism utilizing a spring hinge in which the flexible member is subject to a compressive, axial load, not exceeding the critical buckling value, this load also serving to maintain the flexible member in its proper position obviating the necessity of providing mounting holes in the flexible member for securing it in the switch assembly.

A further object is to provide a thermally responsive switching mechanism being particularly adaptable for use as an electric hot water heater thermostat.

These and further objects are pointed out and explained in the following description and appended claims.

In the drawings:

Figure 1 illustrates a top view of the complete thermostatic switch.

Figure 2 illustrates a bottom view of the complete thermostatic switch.

Figure 3 illustrates a bottom view of the switch assembly separated from the thermostatic actuator assembly.

Figure 4 illustrates a sectional side view of the complete thermostatic switch, the section of the switch being taken generally along the line IV—IV of Figure 3 and the section of the thermostatic actuator assembly being taken generally along the line IVa—IVa of Figure 2.

Figure 5 illustrates a sectional end view of the complete thermostatic switch, the section being taken generally along the line V—V of Figure 4.

Figure 6 is an enlarged view of the flexible hinge member.

Figure 7 is an enlarged, fragmentary view of the pivot assembly.

Figure 8:
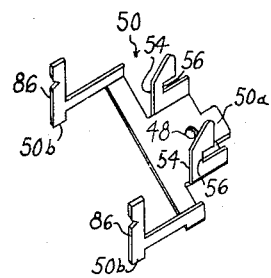
Figure 8 is an oblique view of one of the parts of the switch assembly.

Referring now to Figs. 1, 2, 4, and 5, there is shown an assembled thermostatic switch 1 composed of an actuator assembly 2 secured to a switch assembly 3 by means of screws 4.

The various parts of the actuator assembly are contained in a pan-shaped container or casing 5, having a base, an open, flanged face and sidewalls.

Within the casing 5 a rigid bracket 12 is pivotally mounted on the casing 5 by means of extensions 14 projecting loosely through apertures in the casing endwall. The other end 16 (Fig. 4) of bracket 12 is retained by an adjustable calibrating screw 18 threaded in the end 16 and extending loosely through a hole in the base of the casing 5. The head of screw 18 is enlarged and will not pass through the opening in the base; a flexible spring member 42, riveted to the base of casing 5 (see Fig. 4) serves to urge the bracket 12 outwardly and holds the underside of the head of screw 18 tightly against the topside of the base. Struck from the bracket 12 intermediate its ends are marginal, integral tabs 20 extending diagonally out of the plane of the bracket 12 and having inturned fingers 22. A temperature setting or range adjusting screw 30 (Fig. 4) is threaded through an opening in the base of casing 5, extends freely through the bracket 12 and terminates in a tip 26 of reduced diameter. A temperature setting indicator or pointer 34 (Fig. 4) is splined to the screw 30 and, cooperating with suitable indicia 35 (Fig. 1) which may be marked upon the front face of the base, indicates the rotative position of the range screw 30.

The tip 26 of screw 30 extends freely through a central hole in a bimetal strip 24 which extends substantially the entire length of the casing 5 as may be seen in Fig. 2. The bimetal strip extends under, and is retained by, the fingers 22 on the tabs 20. Adjacent the upper, or free end of strip 24, a thrust pin 40 (Fig. 4) extends freely through an opening in the base of the casing 5 and has a reduced end 38 which is adapted to abut the free end of strip 24. An extension of the spring member 42 engages the shoulder formed on pin 40 at its reduced end and serves to retain the pin in place when the free end of strip 24 disengages from the end of pin 40. The opposite end of pin 40 engages a portion of the switch assembly which will be described subsequently. A bracket 44 struck from the base of casing 5 extends around the end of strip 24 and serves as a retainer for the free end of the strip. An opening 43 in strip 24, through which calibrating screw 18 extends, prevents strip 24 from interfering with the positioning of screw 18. From the foregoing it can be seen that with calibrating screw 18, and consequently the supporting fingers 22, set at the desired position, and with the temperature setting screw 30, and consequently the shoulder at the end of screw 30, adjusted to the desired setting, as the temperature of bimetal strip 24 is raised, it will tend to bow outwardly, away from the base, until it engages the fingers 22 which will prohibit further outward bowing of the strip, whereupon, since the lower end of strip 24 is held against movement by the shoulder formed at the end of the screw 30, further increase in the temperature of strip 24 will cause further deformation of strip 24 to take place at the only point which is unrestricted, i. e. at the free, or upper end which will move inwardly exerting a force against the pin 40 moving it inwardly and actuating the switch assembly, as will be subsequently explained. As may be seen especially in Figure 4, the position of fingers 22, as determined by the adjustment of calibrating screw 18, determines the amount strip 24 may bow outwardly without restriction. This position of screw 18 therefore determines the general temperature range within which force will be exerted at the ends of strip 24. The position of screw 30, by determining the point at which the bottom end of strip 24 will be restricted in its inward movement, determines the temperature at which the total deforming forces in strip 24 will result in inward movement of its unrestricted, upper end.

The switch assembly 3 has a switch housing 46 formed of an electrical insulating material, such as Bakelite. A differential adjusting screw 48 extends through a hole in the base of the housing 46 and is threaded into a switch bracket 50, having spaced upstanding ears 54 formed thereon, the bracket 50 being shown in detail in Figure 8. A resilient leaf spring 52, essentially V-shaped, extends across the base of housing 46 with its legs engaging the base of housing 46 and its arch engaging the underside of bracket 50. The spring 52 engages the bracket 50 on the underside of the extending tongue 50a (Figure 8) and, since the head of screw 48 is larger than the hole in the base of housing 46 through which the shank of screw 48 freely extends, the spring 52 serves to urge the bracket 50 into a slightly tilted position with the surfaces 50b (Figure 8) firmly pressed against the base of housing 46. Adjustment of screw 48 so as to draw the central portion of bracket toward the base of housing 46 will compress the spring 52 and shift the vertical position of the ears 54 with reference to the base of housing 46. The bracket 68 has a central indentation 74 which, as shown in Figure 4, is adapted to receive the end of the pin 40 when the switch housing 46 is mounted on the casing 5.

The upturned ears 54 of bracket 50 each have rectangular notches 56 formed in corresponding edges. The lower (as viewed in Figure 7) inner corner of notches 56 serve to seat one edge of a flat, generally rectangular shaped flexure member 60 which may be formed of a phosphor-bronze, spring steel or other resilient material. The member 60 is shown in detail in Figure 6. The opposite edge of the member 60 is retained in rectangular notches 65 (Figure 7) in the depending tabs 66 which are formed from a bracket 68 (Figure 3) which is rigidly secured to a switch arm 88 by rivets or other suitable means. The bracket 88 also has obliquely extending arms 76 having down-turned tips 78 into which are hooked one of the ends of the tension springs 80. The other ends of the springs 80 are hooked through elongated central openings in links 82. The links 82 are held on the notches in the upstanding legs 86 formed at the ends of extending portions of the bracket 50 (Figure 8).

Figure 9:
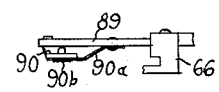
Figure 9 is a fragmentary, side view of the contact structure.

The end 89 of switch arm 88 carries a bridging contact assembly including a contact bar 90. The bar 90 is movably mounted on switch arm 88 by means of a flexible strip 90a (Figure 9) which is riveted to switch arm 88 and to the bar 90. The end of strip 90a extends upwardly through an axial notch in the end of strip 88 and is bent downwardly to retain the bar 90 in proper relationship with the arm 88. The rivet 90b, securing the bar 90 to strip 90a, has a rounded tip which engages the underside of arm 88, and therefore permits limited rocking motion of bar 90 with reference to the arm 88. The bridging contact bar 90 cooperates with the fixed contacts 93. The contacts 93 are the ends of internally threaded sleeves extending through the wall of switch housing 46. Wiring terminal screws 94 are threaded into the internally threaded sleeves and permit the attaching of lead wires to the switch assembly. A barrier 92 is interposed between the terminal screws 94.

In the open-contact position the end 96 of the switch arm 88 engages a boss 98 formed in housing 46 which serves as a stop limiting the motion of arm 88 in the contact opening direction. It will be apparent that the end 96 of arm 88 could be provided with a moveable contact structure and the boss 98 could be replaced by fixed contacts, similar to contacts 93, such arrangements thereby transforming the switch to a double-throw type.

Operation

The complete thermostatic control may be mounted by an suitable means on the outer surface of a tank, such as a hot water tank, the contents of which are to be held at a controlled temperature. With the control temperature set at, for example, 135° F., as shown in Figure 1, and with the tank temperature at a value below this setting, the components of the control will be in the position shown in Figure 4, i. e., contacts 93 will be bridged and a circuit will be completed through the control permitting operation of a heating means for raising the temperature of the tank. As the temperature of bimetal strip 24 increases because of the heat radiated to it from the tank wall, it will exert a force on pin 40 and consequently on switch arm 88 extending to rotate arm 88 counter-clockwise, as viewed in Figure 4. Since the effective pivot point of switch arm 88 is to the left of the centerline of springs 80, this rotative movement of arm 88 will be resisted by the transverse component of the force exerted by the springs 80. As the force exerted by strip 24 increases and the control point temperature is reached, switch arm 88 will be abruptly rotated to a position defined by the engagement of the end 96 of arm 88 with the abutment 98, this movement serving to unbridge the contacts 93 and open the circuit through the control. This movement of arm 88 will be abrupt because as switch arm 88 begins to move, moving the centerline of springs 80 toward the effective pivot of switch arm 88, the transverse component of the force exerted by springs 80 resisting such movement of arm 88 will rapidly decrease and contacts 93 will be suddenly unbridge. The centerline of springs 80 never passes to the opposite side of the effective pivot of switch arm 88 and therefore the switch remains continually biased into the closed-contact position of Figure 4, consequently as bimetal strip 24 cools and moves to the right, as viewed in Figure 4, the switch arm will abruptly move to its closed contact position. Adjustment of the differential adjusting screw 48, thereby varying the position of the effective pivot of switch arm 88 with reference to the base of casing 46 and therefore with reference to the boss 98 and fixed contacts 93, will change the rotational travel of switch arm 88 and thus vary the operating differential of the switch mechanism.

Figure 10:
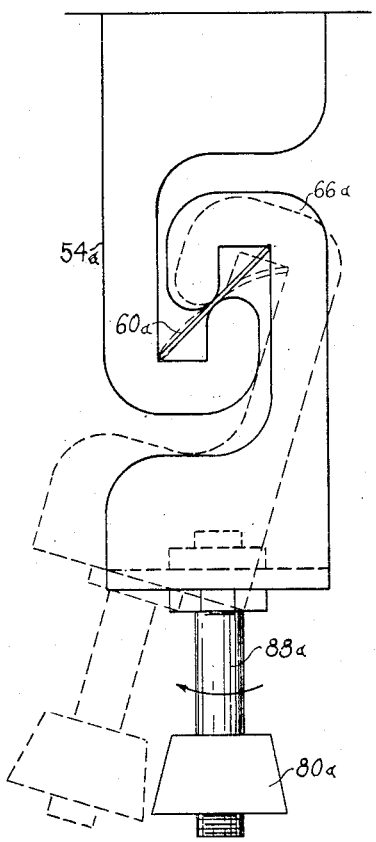
Figure 10 is a schematic side view of an arrangement illustrating certain features of the hinge utilized in the switch assembly.
Figure 11:
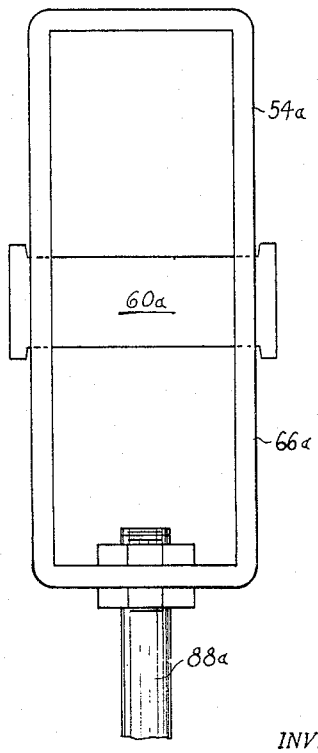
Figure 11 is a front view of the schematic illustration of Figure 10.

The action of the flexure member 60, as switch arm 88 moves, is shown in Figure 7 and is further illustrated in Figures 10 and 11. Figure 10 and 11 schematically indicate the pivot arrangement of the switch assembly and show a depending bracket 54a and a bracket 66a forming a part of an arm 88a capable of limited pivotal movement because of the flexure of a flexure member 60a which is held in compression by the downward force exerted by a weight 80a which corresponds to the force exerted by the springs 80 in the switch assembly shown in the preceding figures. The weight 80a places the flexible member 60a in axial compression and as a lateral force is applied to arm 88a, the member 60a will flex in the area at which it is engaged by the rounded, reversely formed ends of brackets 54a and 66a. It will be apparent that a portion of the force exerted by the weight 80a will be applied as an axially compressive force to the flexible member 60a, resulting in a pivot having the advantages previously discussed, and that the pivot structure is stabilized by the confinement of the flexible member intermediate its side edges by the ends of the brackets 54a and 66a. It will also be noted that the pivot structure is held in properly assembled relationship by the force exerted by the weight 80a (comparable to the force exerted by springs 80 in the switch assembly of the previous figures) which also serves to apply the stiffness-compensating, compressive load to flexible member 60a. This loading of the flexible member in compression and holding of the pivot structure in assembled relation is accomplished without the necessity of punching mounting holes in the flexible member or otherwise providing specialized means for mounting of the flexible member.

Certain aspects of the present invention, such as the pivot structure may, of course, be utilized in various types of control apparatus and have been found to be particularly advantageous as a component of an electric water heater thermostat which is the type of control apparatus here described and illustrated. Although this particular embodiment of the invention has been shown and described, it is obvious that many modifications may occur to those skilled in the art and this invention, therefore, is intended to be limited only by the scope of the appended claims and the prior art.

What is claimed is:

1. In a control device, control means adapted to be moved, a pivotally moveable member for moving said control means, and pivot means for said member comprising a flexure member subjected to axial compressive stress, and cooperating abutment means for supporting said flexure member intermediate its ends.

2. In a control device, control means adapted to be moved, a pivotally moveable member for moving said control means, and pivot means for said member comprising a flexure member subjected to axial compressive loading less than the critical buckling load for said flexure member, and cooperating abutment means for supporting said flexure member intermediate its ends.

3. In a control device, control means adapted to be moved, pivotally movable member for moving said control means, and pivot means for said member comprising a flexure member subjected to axial compressive stress, and cooperating abutments for supporting said flexure member intermediate its ends, at least one of said abutments being carried by said pivotally moveable member.

4. In a control device, control means adapted to be moved, a pivotally moveable member for moving said control means, and pivot means for said member comprising a flexure member subjected to axial compressive loading less than the critical buckling load for said flexure member, and cooperating abutments for supporting said flexure member intermediate its ends, one of said abutments being carried by said pivotally moveable member.

5. In a switching mechanism, switch means adapted to be moved, a pivotally moveable switch arm for moving said switch means, and pivot means for the switch arm comprising a flexure member subjected to axial compressive loading less than the critical buckling load for said flexure member for decreasing the resistance to flexure of said flexible member and consequently decreasing the force-deflection ratio of said pivot means, and cooperating opposed abutments for supporting said flexure member intermediate its ends, one of said abutments being carried by said switch arm.

6. In a control device, control means adapted to be moved, a pivotally moveable member for moving the control means having a retaining notch therein, a stationary member having a retaining notch therein facing the notch in the moveable member, hinge means for pivotally connecting the moveable and stationary members comprising a thin flexure member having opposed edges seated in said retaining notches and means exerting a force on said moveable member producing an axial compressive loading on said flexure member less than the critical buckling load for said flexure member for decreasing the resistance to flexure of said flexible member and consequently decreasing the force-deflection ratio of said hinge means.

7. In a control device, control means adapted to be moved, a pivotally moveable member for moving the control means having a retaining notch therein, a stationary member having a retaining notch therein facing the notch in the moveable member, hinge means for pivotally connecting the moveable and stationary members comprising a thin flexure member having opposed edges seated in said retaining notches and means exerting a force on said moveable member producing an axial compressive loading on said flexure member less than the critical buckling load for said flexure member for decreasing the resistance to flexure of said flexible member and consequently decreasing the force-deflection ratio of said hinge means, and cooperating abutment means for supporting said flexure member intermediate its said opposed edges.

8. In a control device, control means adapted to be moved, a pivotally moveable member for moving the control means having a retaining notch therein, a stationary member having a retaining notch therein facing the notch in the moveable member, hinge means for pivotally connecting the moveable and stationary members comprising a thin flexure member having opposed edges seated in said retaining notches and means exerting a force on said moveable member producing an axial compressive loading on said flexure member less than the critical buckling load for said flexure member for decreasing the resistance to flexure of said flexible member and consequently decreasing the force-deflection ratio of said hinge means, and cooperating opposed abutments for supporting said flexure member intermediate its said opposite edges, one of said abutments being carried by the moveable member.

9. In a control device, control means adapted to be moved, a pivotally moveable member for moving the control means having a retaining notch therein, a stationary member having a retaining notch therein facing the notch in the moveable member, hinge means for pivotally connecting the moveable and stationary members comprising a thin flexure member having opposed edges seated in said retaining notches and means exerting a force on said moveable member producing an axial compressive loading on said flexure member less than the critical buckling load for said flexure member for decreasing the resistance to flexure of said flexible member and consequently decreasing the force-deflection ratio of said hinge means, and cooperating opposed abutments for supporting said flexure member intermediate its said opposite edges, one of said abutments being carried by the moveable member, and its opposing abutment being carried by the stationary member.

10. In a control device, control means adapted to be moved, a pivotally moveable member for moving said control means, pivot means for said moveable member comprising a flexure member and loading means comprising a spring acting on said moveable member to provide a force having a component acting transverse to the longitudinal axis of said moveable member for urging the moveable member to pivotally move in one direction, said force also having a component acting parallel to the longitudinal axis of said moveable member for subjecting the flexure member to axial compressive loading less than the critical buckling load for said flexure member and decreasing the resistance to flexure of the flexible member and consequently decreasing the force-deflection ratio of said pivot means.

11. In a control device, control means adapted to be moved, a pivotally moveable member for moving said control means, pivot means for said moveable member comprising a flexure member and loading means comprising a spring acting on said moveable member to provide a force having a component acting transverse to the longitudinal axis of said moveable membebr for urging the moveable member to pivotally move in one direction, said force also having a component acting parallel to the longitudinal axis of said moveable member for subjecting the flexure member to axial compressive loading less than the critical buckling load for said flexure member and decreasing the resistance to flexure of the flexible member and consequently decreasing the force-deflection ratio of said pivot means, and cooperating abutments for supporting said flexure member intermediate its ends.

12. In a control device, control means adapted to be moved, a pivotally moveable member for moving said control means, pivot means for said moveable member comprising a flexure member and loading means comprising a spring acting on said moveable member to provide a force having a component acting transverse to the longitudinal axis of said moveable member for urging the moveable member to pivotally move in one direction, said force also having a component acting parallel to the longitudinal axis of said moveable member for subjecting the flexure member to axial compressive loading less than the critical buckling load for said flexure member and decreasing the resistance to flexure of the flexible member and consequently decreasing the force-deflection ratio of said pivot means, and cooperating abutments for supporting said flexure member intermediate its ends, one of said abutments being carried by said moveable member.

13. In a switching means, a base, a fixed contact carried by the base, a moveable contact cooperating with said fixed contact, a moveable member adapted to move the moveable contact and being pivotally moveable with respect to the base, pivot means for said moveable member comprising a flexure member and loading means comprising a spring acting between the base and the moveable member to provide a force having a component acting transverse to the longitudinal axis of the moveable member for urging the moveable member to pivotally move in one direction, said force also having a component acting parallel to the longitudinal axis of said moveable member of subjecting the flexure member to axial compressive loading less than the critical buckling load for said flexure member and decreasing the resistance to flexure of the flexure member and consequently decreasing the force-deflection ratio of said pivot means.

14. In a switching means, a base, a fixed contact carried by the base, a moveable contact cooperating with said fixed contact, an elongated moveable member adapted to move the moveable contact and being pivotally moveable with respect to the base, pivot means for said moveable member comprising a flexure member and loading means comprising a tension spring acting between the base and the moveable member to provide a force having a component acting transverse to the longitudinal axis of the moveable member for urging the moveable member to pivotally move in one direction, said force also having a component acting parallel to the longitudinal axis of said moveable member for subjecting the flexure member to axial compressive loading less than the critical buckling load for said flexure member and decreasing the resistance in flexure of the flexure member and consequently decreasing the force-deflection ratio of said pivot means, and cooperating opposed abutments supporting said flexure member intermediate its ends, one of said abutments being carried by the moveable member and its opposing abutment being carried by the base.

15. In a switching means, a base, a fixed contact carried by the base, a moveable contact cooperating with said fixed contact, a moveable member adapted to move the moveable contact and being pivotally moveable with respect to the base, pivot means for said moveable member comprising a flexure member and loading means comprising a spring attached to said base and to said moveable member providing a force having a component acting transverse to the longitudinal axis of the moveable member for urging the moveable member to pivotally move in one direction, said force also having a component acting parallel to the longitudinal axis of said moveable member for subjecting the flexure member to axial compressive loading less than the critical buckling load for said flexure member and decreasing the resistance to flexure of the flexure member and consequently decreasing the force-deflection ratio of said pivot means, and adjusting means for displacing the point of attachment of said spring and said base relative to the moveable member to vary the magnitude of said first mentioned force component.

16. A pivot means for control members comprising, a pivotally moveable member, a base, a flexure member interposed between said moveable member and said base co-operating abutments for supporting said flexure member intermediate its ends, and spring loading means acting on said moveable member to add a stress to said flexure member less than the critical buckling load for said flexure member and thereby decreasing the resistance to flexure of the flexure member and consequently decreasing the force-deflection ratio of said pivot means.

17. In a control device, control means adapted to be moved, a pivotally moveable member for moving said means and pivot means for said member comprising a flexure member subjected to continuous axial stress, and cooperating abutment means for supporting said flexure member intermediate its ends.

18. In a control device, control means adapted to be moved, a pivotally moveable member for moving the control means having a retaining notch therein, a stationary member having a retaining notch therein opposite the notch in the moveable member, hinge means for pivotally connecting the moveable and stationary members comprising a thin flexure member having opposed edges seated in said retaining notches and means exerting a force on said moveable member producing a continuous axial stress therein.

References Cited in the file of this patent

UNITED STATES PATENTS

| Number | Name | Date |
|---|---|---|
| 2,388,702 | Pearce | Nov. 13, 1945 |
| 2,491,140 | Sweger | Dec. 13, 1949 |
| 2,498,020 | Trainor | Feb. 21, 1950 |